United States Patent
Bourasseau et al.

(10) Patent No.: US 10,367,351 B2
(45) Date of Patent: Jul. 30, 2019

(54) ENERGY MANAGEMENT METHOD ALLOWING A DISTRIBUTION OF THE ENERGY BETWEEN AN ELECTRICAL NETWORK AND A PROCESSING SYSTEM INTENDED IN PARTICULAR TO STORE ENERGY

(71) Applicant: COMMISSARIAT A L'ENERGIE ATOMIQUE ET AUX ENERGIES ALTERNATIVES, Paris (FR)

(72) Inventors: Cyril Bourasseau, Grenoble (FR); Benjamin Guinot, Saint-martin-le-vinoux (FR); Florent Montignac, Grenoble (FR); Timo Mutka, Grenoble (FR)

(73) Assignee: COMMISSARIAT A L'ENERGIE ATOMIQUE ET AUX ENERGIES ENERGIES ALTERNATIVES, Paris (FR)

( * ) Notice: Subject to any disclaimer, the term of this patent is extended or adjusted under 35 U.S.C. 154(b) by 878 days.

(21) Appl. No.: 14/441,573

(22) PCT Filed: Nov. 5, 2013

(86) PCT No.: PCT/EP2013/073025
§ 371 (c)(1),
(2) Date: May 8, 2015

(87) PCT Pub. No.: WO2014/072278
PCT Pub. Date: May 15, 2014

(65) Prior Publication Data
US 2015/0311703 A1    Oct. 29, 2015

(30) Foreign Application Priority Data

Nov. 9, 2012 (FR) .................... 12 60657

(51) Int. Cl.
*H02J 1/00* (2006.01)
*H02J 15/00* (2006.01)
*H02J 3/28* (2006.01)

(52) U.S. Cl.
CPC ............. *H02J 1/00* (2013.01); *H02J 15/00* (2013.01); *H01M 2250/40* (2013.01); *H02J 3/28* (2013.01); *H02J 2001/004* (2013.01); *Y02E 70/30* (2013.01)

(58) Field of Classification Search
CPC .. H01M 8/0612; H01M 8/065; H01M 8/0656; H01M 2250/10; H01M 2250/402;
(Continued)

(56) References Cited

U.S. PATENT DOCUMENTS 7,444,189 B1    10/2008    Marhoefer
2003/0227276 A1    12/2003    Agbossou et al.
(Continued)

FOREIGN PATENT DOCUMENTS

FR    2998109 B1    6/2015
WO    2009/019159 A2    2/2009
(Continued)

OTHER PUBLICATIONS

International Search Report and Written Opinion dated Mar. 24, 2014, issued in corresponding application No. PCT/EP2013/073025; with English partial translation and partial machine translation.
(Continued)

*Primary Examiner* — Rexford N Barnie
*Assistant Examiner* — Elim Ortiz
(74) *Attorney, Agent, or Firm* — Westerman, Hattori, Daniels & Adrian, LLP (57) ABSTRACT

The energy management method comprises a step of harvesting (E1) of an electrical energy from an energy source
(Continued)

(1), notably from a renewable energy source and a step of distribution (E2) of the harvested electrical energy configured to be controlled in such a way as to, in a first configuration, inject at least a part of the harvested electrical energy into an electrical network (2), and, in a second configuration, inject at least a part of the harvested electrical energy into a processing system (3) configured in such a way as to store it in a tank (4). A step of control (E3) of the distribution of the electrical energy (E2) comprises a step of determination of a state of storage of the tank (4) and a step of determination of a time to delivery for at least a predetermined part of the content of the tank (4).

23 Claims, 3 Drawing Sheets (58) Field of Classification Search
CPC .... H01M 2250/405; H02J 15/00; H02J 3/382; H02J 7/34; H02J 2001/004; H02J 3/383; H02J 3/386; H02J 3/28; H02J 1/00; Y02B 90/12; Y02B 90/14; Y02B 90/16; Y02E 70/10; Y02E 70/30
See application file for complete search history.

(56) References Cited

U.S. PATENT DOCUMENTS

2005/0225090 A1  10/2005  Wobben
2009/0048716 A1* 2/2009  Marhoefer .......... H01M 8/0612
                                            700/291
2010/0259102 A1* 10/2010 Guelbenzu Michelena ................
                                            F03D 9/00
                                            307/65
2013/0317959 A1* 11/2013 Joos ........................ C25B 15/02
                                            705/34

FOREIGN PATENT DOCUMENTS

WO      2010/048706 A1    5/2010
WO      2011/055218 A1    5/2011

OTHER PUBLICATIONS

French search report and written opinion dated Aug. 16, 2013 in priority French application No. FR1260657 (with English machine translation; 16 pages).
English translation of International written opinion dated Mar. 24, 2014 in corresponding international application No. PCT/EP2013/073025 (6 pages).
International Preliminary Report on Patentability dated May 12, 2015 in corresponding international application No. PCT/EP2013/073025 (with English machine translation; 14 pages).
EP applicants amendments and comments to European (International) search report and written opinion, dated Jan. 14, 2016 in corresponding European application No. EP13789242.8 (with English machine translation; 18 pages).
EP decision to granted dated May 11, 2018 in corresponding European application No. EP13789242.8 (with English machine translation and English translation of granted claims; 11 pages).

* cited by examiner

ENERGY MANAGEMENT METHOD ALLOWING A DISTRIBUTION OF THE ENERGY BETWEEN AN ELECTRICAL NETWORK AND A PROCESSING SYSTEM INTENDED IN PARTICULAR TO STORE ENERGY

TECHNICAL FIELD OF THE INVENTION

The invention relates to the field of energy management.

More particularly, the subject of the invention is a management method allowing the distribution of an energy on an electrical network and/or a processing system configured in such a way as to store said energy in a tank.

STATE OF THE ART

The renewable energy sources are being increasingly widely used for the purposes of electricity generation.

"Renewable energy source" should be understood to mean a source of energy whose operation may be intermittent depending on the random factors of nature. Such a source is therefore difficult to exploit. The electrical energy from such a renewable energy source is intended to be injected/inserted into an electrical network. Studies show that this unpredictability of the operation of the renewable energy limits the possible rate of insertion thereof on the current electrical network. Indeed, a significant injection of electricity onto the electrical network at a moment when the consumption from said network is low can compromise the safety of the network.

These days, it is possible for an operator of a renewable energy source to inject its electricity production without constraints onto the network (the significant injected power variations are allowed). This is possible because the power of the overall renewable energy source installed is relatively low compared to the installed power of the conventional technologies (nuclear power plants, gas power plants, etc.).

Document U.S. Pat. No. 7,444,189 describes a renewable energy source linked on the one hand to an electrical network of a building and on the other hand to an electrolyzer configured to store hydrogen for its use in a fuel cell. The fuel cell makes it possible to supply current from the stored hydrogen. The distribution of the energy from the renewable energy source is performed in such a way as to minimize the costs according to the needs of an installation.

OBJECT OF THE INVENTION

The aim of the present invention is to propose a solution that makes it possible to optimize the distribution of an electrical energy and the storage of a part of this energy, notably in the form of a hydrogen-based product.

This aim is close to being achieved in that the energy management method comprises: a step of harvesting of an electrical energy from an energy source, notably from a renewable energy source; a step of distribution of the harvested electrical energy configured to be controlled in such a way as to, in a first configuration, inject at least a part of the harvested electrical energy into an electrical network and, in a second configuration, inject at least a part of the harvested electrical energy into a processing system configured in such a way as to store it in a tank; and in that it comprises a step of control of the distribution of the electrical energy comprising a step of determination of a state of storage of the tank and a step of determination of a time to delivery of at least a predetermined part of the content of the tank.

According to one embodiment, the method comprises a step of transformation of at least a part of the electrical energy injected into the processing system into a product to be stored in the tank, and it comprises a step of storage of the product in the tank.

Advantageously, the transformation step comprises a step of electrically powering an electrolyzer of the processing system by all or part of the electrical energy injected into the processing system so as to generate the product comprising hydrogen.

Preferably, the control step comprises a step of determination of energy distribution constraints on the electrical network.

According to one implementation, the control step comprises: a step of determination of a first indicator from the determined state of storage and from the determined time to delivery; a step of determination of a second indicator from the determined distribution constraints; a step of comparison of the first indicator with the second indicator; and a step of determination of setpoints for the control of the distribution of the harvested electrical energy from the result of the comparison.

For example, the first indicator is equal to the following formula: $\sqrt{1-TTD^2} \times (1-SOC) + (1-\sqrt{1-(1-TTD)^2}) \times SOC$ with TTD being the determined time to delivery varying between the value 0, when the time to delivery has expired, and the value 1 when the tank has just been emptied or replaced, and SOC being the state of storage of the tank varying between 0, when the tank is empty, and 1 when the tank is full.

Advantageously, the control step is performed continuously so as to adjust the operation of the distribution step over time.

According to one embodiment, the method comprises a step of storage in a battery of at least a part of the energy injected into the processing system.

Advantageously, the method comprises a step of production of electricity by a fuel cell using the content of the tank as fuel.

The method can further comprise a step of delivery of said at least a predetermined part of the content of the tank on expiry of said determined time to delivery.

Advantageously, based on a period remaining before the expiry of the determined time to delivery and on the determined state of storage of the tank, the control step is configured in such a way that the filling of the tank is performed during the remaining period by a method chosen from: a linear filling, a non-linear filling, a filling at the start of the remaining period, a filling at the end of the remaining period, or an intermittent filling.

The invention also relates to an energy management device comprising: an element for harvesting an electrical energy from an energy source, notably from a renewable energy source; an element for distributing the harvested electrical energy configured in such a way as to exhibit a first configuration in which at least a part of the harvested electrical energy is injected into an electrical network and a second configuration in which at least a part of the harvested electrical energy is injected into a processing system intended to store it in a storage tank; and an element for controlling the distribution of the electrical energy comprising an element for determining a state of storage of the tank and an element for determining a time to delivery of at least a part of the content of the tank.

Advantageously, the processing system comprises an electrolyzer powered by the energy injected into said processing system in order to store said injected energy in the form of a product comprising hydrogen.

Moreover, the device can comprise a computer configured to perform steps of the method as described.

The invention also relates to a computer-readable data storage medium, on which is stored a computer program comprising computer program code means for implementing steps of the method described.

The invention also relates to a computer program comprising a computer program code means suitable for performing steps of a method as described, when the program is run by a computer.

BRIEF DESCRIPTION OF THE DRAWINGS

Other advantages and features will emerge more clearly from the following description of particular embodiments of the invention, given as nonlimiting examples and represented in the attached drawings, in which.

DESCRIPTION OF PREFERENTIAL EMBODIMENTS OF THE INVENTION

The method described below differs from the prior art notably by its management of the distribution of the energy from an energy source, in particular a renewable energy source.

Figure 1:
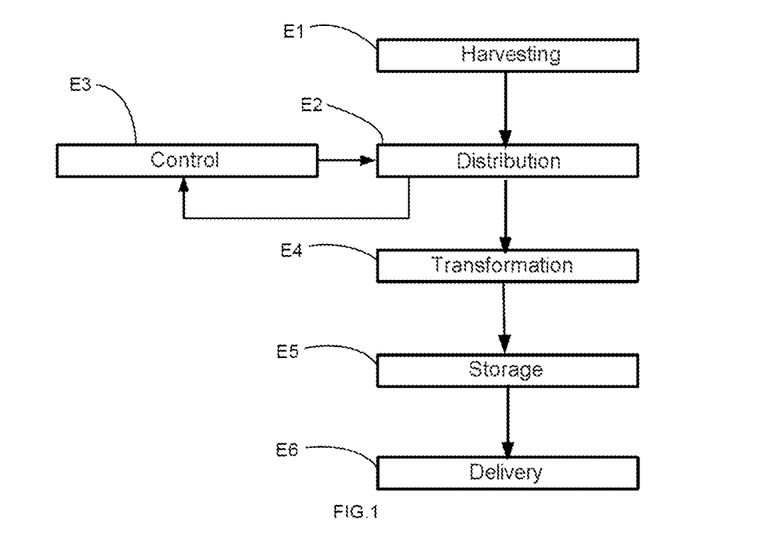
FIG. 1 schematically illustrates steps of a method according to a particular embodiment of the invention.
Figure 2:
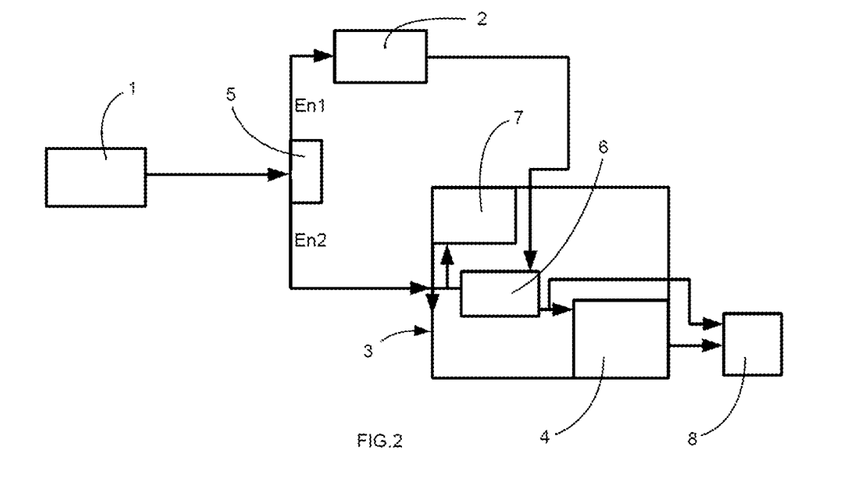
FIG. 2 illustrates a complete installation suitable for implementing the method of FIG. 1.

Thus, as illustrated in FIGS. 1 and 2, the energy management method can comprise a step of harvesting E1 of an electrical energy from an energy source 1, notably from a renewable energy source. This electrical energy can be from a renewable energy source such as, for example, solar energy, wind energy, or water energy and can be respectively generated by a photovoltaic module, a wind turbine or a weir plant transforming the energy from said renewable energy source into electricity. The method also comprises a step of distribution E2 of the harvested electrical energy configured to be controlled in such a way as to, in a first configuration, inject at least a part En1 of the harvested electrical energy into an electrical network 2. This step of distribution of the harvested electrical energy can also be configured in such a way as to, in a second configuration, inject at least a part En2 of the harvested electrical energy into a processing system 3 configured in such a way as to store it in a tank 4. In fact, the concept of "distribution" is used in the context of the method to allow an arbitration between an injection into the electrical network 2 and a powering of the processing system 3.

By definition, an electrical network 2 can be considered as a set of infrastructures making it possible to convey an electrical energy from production centres to consumers of electricity. In order to be stable, such an electrical network has to receive as much electricity as it has to supply. In fact, if the production differs from the consumption, there then occurs a change of frequency of the network, which can damage all the electrical equipment items connected to said network.

In fact, in the first configuration, all the harvested electrical energy can be injected En1 into the electrical network 2, or the harvested electrical energy can be fully distributed between the electrical network 2 and the processing system 3. The same applies for the second configuration where all the harvested electrical energy can be injected En2 into the processing system 3, or the harvested electrical energy can be fully distributed between the electrical network 2 and the processing system 3. The distribution can be performed by a distribution element 5.

Furthermore, the method comprises a step of control E3 of the distribution of the electrical energy E2 comprising a step of determination of a state of storage of the tank 4 and a step of determination of a time to delivery (also called time to supply) of at least a predetermined part of the content of the tank 4. From these determined state of storage and time to delivery data, the control step E3 can dose the injection of electricity into the electrical network 2 and/or into the processing system 3.

"Storage in a tank" should be understood to mean a storage in any possible type of form. Thus, the electrical energy can be stored in a tank-forming battery, or be transformed to be stored in its transformed state. In other words, the method can preferentially comprise a step of transformation E4 of at least a part of the electrical energy injected into the processing system 3 (preferably all the electrical energy injected into the processing system is transformed) into a product to be stored in the tank 4, and a step of storage E5 of the product in the tank 4.

"Time to delivery" should be understood to mean a delay, which, when it expires, provokes the delivery of a predetermined quantity of the tank. In other words, this time to delivery is a constraint provoking an obligation to deliver content from the tank on a given date. Preferably, the predetermined quantity corresponds to the total capacity of the tank or to all that is present in the tank, for example by a delivery of the tank 4 itself. It will then be understood that, in this particular case, the control step E3 will make it possible to ensure that, at the end of the time to delivery, the tank will be full. For this, it will be possible to use an indicator of the state of storage of the tank, such as a gauge.

According to a nonlimiting example, the state of storage of the tank 4 decreases only at the time of expiry of the time to delivery. In other words, during a so-called filling period separating two consecutive deliveries each associated with a time to delivery, no content is taken from the tank, nor is the tank itself taken.

The control step E3 can also comprise a step of determination of the quantity of energy harvested, that is to say the quantity of energy produced from the renewable energy source over a given period or for example a power at an instant "t", this making it possible to control, at each instant "t", the distribution of the electrical energy actually harvested.

Advantageously, the stored product comprises hydrogen. Such a product is intended to be used to make, for example, a fuel cell operate in order to restore the electricity. Thus, the transformation step E4 can comprise a step of electrically powering an electrolyzer 6 of the processing system 3 by all or part of the electrical energy injected into the processing system 3 so as to generate the product comprising hydrogen. The operation of an electrolyzer 6 to form a product comprising hydrogen, for example a dihydrogen gas, notably from water, will not be described here because it is well known to those skilled in the art. In fact, the transformation step can also be implemented by electrically powering a plurality of electrolyzers. The electrolyzer or electrolyzers can be of alkaline or PEM (proton exchange membrane) or HTE (high temperature electrolysis) technology. Moreover, the storage of the hydrogen can be done in different forms (pressure, liquid, hydrides, adsorbent materials, or a combination of these technologies).

As indicated in the prior art, these days it is common practice for an operator of a renewable energy source to inject its production without constraints onto the electrical network 2. However, the increase in the share of the renewable energies 1 in the energy mix may necessitate either adapting the electrical network 2 to these intermittent productions in the form of renewable energies, or constraining the producers to control their injections on the basis of the possibilities offered by the network at the time of injection. It will therefore be understood that, depending on the type of the electrical network, it may be advantageous to inject current into the latter only subject to certain constraints. These constraints may, for example, be a contractually committed quantity to be injected (for example observing a given injection profile in terms of power and in terms of quantity of energy), the price yield of the injection of electricity onto the electrical network, observing a total percentage of energy from renewable energy source(s) within the electrical network, ensuring a particular service, or a mix of these constraints, etc. Thus, preferentially, the control step comprises a step of determination of energy distribution constraints on the electrical network 2. These constraints to be determined can be, for example, stored in a table characterizing the installation associated with the management method, supplied in real time by the operator of the electrical network 2, etc.

In order to optimize the control E3 of the distribution E2, the control step E2 can comprise a step of determination of a first indicator from the determined state of storage and from the determined time to delivery. Moreover, the control step E2 can also comprise a step of determination of a second indicator from the determined distribution constraints. A step of comparison of the first indicator with the second indicator enables the control step E2 to determine, in an associated step, the setpoints for the control of the distribution of the harvested electrical energy from the result of the comparison.

It will be understood from what has been said above that a person skilled in the art will have to generate comparable indicators.

By way of example, the first indicator is equal to the following formula: $\sqrt{1-TTD^2} \times (1-SOC) + (1-\sqrt{1-(1-TTD)^2}) \times SOC$ with TTD being the determined time to delivery and SOC being the state of storage of the tank (SOC being for "State of charge"). SOC can take the value 0 or 0% when the storage is empty and the value 1 or 100% when the latter is full or reaches the appropriate filling level. The SOC indicator changes by an increasing trend as the storage fills (from 0 to 1). TTD can take the value 0 when the date and time of delivery are reached and the value 1 when the storage has just been emptied or replaced and the system is awaiting the next delivery. The TTD indicator can follow a linearly decreasing trend over the time between two deliveries (from 1 to 0). It should be noted that, immediately after delivery, the storage indicator SOC takes the value 0. In other words, the determined time to delivery TTD can vary between the value 0, when the time to delivery has expired, and the value 1 when the tank has just been emptied or replaced, and the state of storage SOC of the tank can vary between 0, when the tank is empty, and 1 when the tank is full. This first indicator is simple to implement in as much as the equipment for measuring the parameters that make it possible to determine it are readily available. Furthermore, the assessment by this indicator is rapid.

Figure 3:
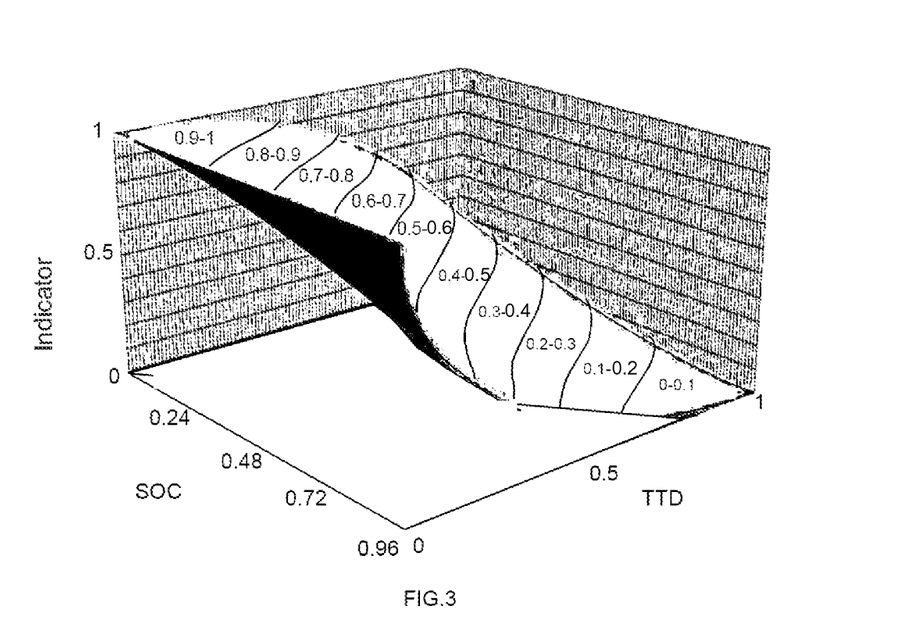
FIG. 3 illustrates a graphic representation of the value of an indicator as a function of the state of storage and of the time to delivery.

FIG. 3 graphically represents the function of the indicator varying from 0 to 1 from the above formula, with SOC varying from 0% to 100% and TTD varying from 0 to 1. The graphic representation shows that the indicator calculated from this function takes the value 1 when the storage is empty (SOC=0%) or when the date of delivery approaches (TTD=0).

Thus, the closer the indicator concerned is to 1, the more the control step will tend to favour the injection of electricity to the processing system 3.

Still by way of example, the second indicator can reflect the need of the electrical network 2 to receive an injection of electricity. This indictor can be denoted NEI (Need for Electrical Injection) which takes the value 0 when the network does not want to receive more injection and 1 in the extreme opposite case. The need for injection of electricity may be linear between these two values. This indicator may be either known, or supplied by another computation algorithm. The information from the parties involved in the electrical network may be of different kinds (depending on the parties involved) and may reflect technical, economic and/or environmental needs.

All of the information received, translated into indicators, then has the algorithm applied to it, notably through the comparison step, in order to then determine a mode of operation at the instant "t" that makes it possible to optimize the distribution (for example ensure the filling of the hydrogen tanks to observe the time to delivery and volume constraints, and as closely as possible follow the needs of the network in terms of additional injection). As explained above, the mode of operation can be chosen from three possible configurations chosen from: 100% of the energy produced by the source is injected to the electrical network 2; 100% of the energy produced by the source is injected to the processing system 3 (notably so as to be used to produce dihydrogen); a mix of the abovementioned two configurations.

The electricity needs of the electrical network 2 or of the processing system 3 can vary over time. The result of this is therefore a need to adapt the control over time. To address this issue, the control step E3 can be performed continuously or periodically so as to adjust the operation of the distribution step E2 over time. In fact, according to a particular embodiment, the time step or period step is 1 minute but can also vary from a second to an hour, so it will therefore be understood that the step will be adapted according to the application. The computations and the comparison of the indicators can in fact be performed at regular intervals (on each time step). Preferentially, on each time step, the acquisition of data is performed to allow optimized control: a computation of the SOC and of the TTD, a computation of the first indicator that is a function of the two computed variables SOC and TTD, a computation of the second indicator that is a function of the constraints and obligations of the network, a comparison of the first and second indicators, and finally establishing of operating setpoints for the control of the distribution (by taking account of the physical, technical or safety constraints of the system).

According to an implementation that can be combined with all that has been stated above, the method can comprise a step of storage, in a battery 7, of at least a part of the energy injected into the processing system 3. This battery 7 can be the tank targeted above or be independent of the tank 4.

The method can also comprise a step of production of electricity by a fuel cell 8 using the content of the tank 4 as fuel.

A fraction of the product can optionally be consumed directly without storage. For example, at the output of the electrolyzer 6, the product generated can be directly used to power a fuel cell 8 (FIG. 2) or for other purposes.

The method advantageously comprises a step of delivery E6 of said at least a predetermined part of the content of the tank 4 on expiry of said determined to delivery. Preferably, as described previously, on expiry of the time to delivery, the delivery consists in delivering all the content of the tank, for example by totally emptying it or by replacing it with an empty tank and moving the replaced tank.

According to a variant, the control step E2 is performed in such a way that, on expiration of the time, the tank is full or its state of storage lies within a range predetermined in accordance with a demand from an entity likely to use the content of the tank, for example hydrogen.

Different control strategies will be able to be implemented. For example, based on a period remaining before the expiry of the determined time to delivery and on the determined state of storage (corresponding preferably to the current state of storage of the tank for example measured using a gauge) of the tank 4, the control step E3 can be configured in such a way that the filling of the tank 4 is performed during the remaining period by a method chosen from: a linear filling (notably over the entire period), a nonlinear filling (notably over the entire period), a filling at the start of the remaining period, a filling at the end of the remaining period, or an intermittent filling. "Filling at the start of the remaining period or at the end of the remaining period" should be understood, for example, to mean that the remaining period is divided into at least two time spans, a first time span during which all, or most, of the harvested energy is injected into the electrical network 2 and a second time span during which all, or most, of the harvested energy is injected into the processing system 3. In fact, the filling can be done in all possible ways, notably intermittently, FIG. 4 illustrates only a few possibilities accessible to those skilled in the art who will be able to derive therefrom, or optimize therefrom, others according to different algorithms.

Figure 4:
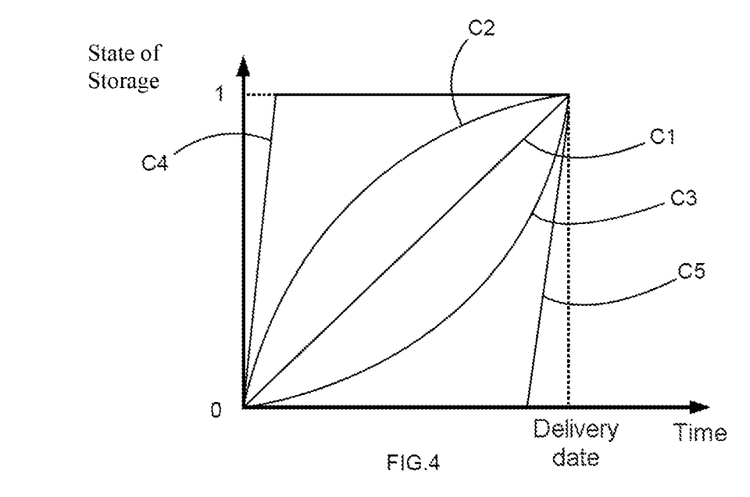
FIG. 4 illustrates different strategies for filling a tank over a period.

These strategies are illustrated by way of example in FIG. 4, the time between 0 and "date of delivery" then corresponds to the remaining period and the state of storage at 1 corresponds to a full tank. The curve C1 represents the case where the filling is linear, the curves C2 and C3 represent the case where the filling is nonlinear, and the curves C4 and C5 represent the case where the filling takes place respectively at the start of the remaining period and at the end of the remaining period.

These different strategies each have their advantages but do not necessarily make it possible to observe all the constraints applied to a given system. For example, if a decision is made to fill the tank at the last moment (just before the date of delivery), there is a risk of no longer having enough electricity available to completely fill the storage (that is to say the tank 4) in the case of strong constraint of the electrical network or in the case of unavailability of the renewable resource. Conversely, if the storage is filled very rapidly, the hydrogen is greatly prioritized, with the risk, during this filling phase, of not meeting the obligations and constraints linked to the electrical network 2.

In order to mitigate certain "hollows in operation" of the energy source, the electrolyzer 6 can also be configured to be linked electrically to the electrical network 2 (FIG. 2). In other words, the method can comprise a step of electrically powering the electrolyzer 6 by the electrical network 2 to form the product comprising hydrogen. This strategy will be able to implemented for example in a case of last resort when the tank 4 is not full, or its state of storage is below an associated threshold, and the period remaining before the expiry of the time to delivery is below an associated time threshold. For example, this strategy can be prioritized if the case of the curves C3 and C5 of FIG. 4 applies.

Although the method has been described on the basis of the harvesting of energy from an energy source, preferably renewable, it can also take into account a number of renewable energy sources, a number of electrical networks and a number of processing systems, for example disseminated over a number of sites. Consequently, it is possible to manage each of the sites independently on the basis of different constraints, for example delivery constraints. Of course, all the sites can also have to address one and the same electrical network need, and therefore the sites may not be completely independent.

Generally, it is also possible to provide a step for an operator to request validation of the harvested energy distribution control strategy implemented by the control step. This makes it possible to provide an additional control concerning the strategy.

Moreover, the control step E3 can also manage the distribution by taking into account the hydrogen procurement cost, the resale price of the hydrogen, the resale price on the electrical network of the harvested energy, etc.

The method as described assumes numerous advantages, notably according to the embodiments described above, it allows: an ongoing arbitration of different uses of the electricity deriving from the renewable energy source between the electrical network and the processing system; the taking into account of constraints and obligations linked to the production of the product comprising hydrogen and of constraints and obligations linked to the injection of electricity on the electrical network; the taking into account of parameters linked to the storage of the product comprising hydrogen; a use of all of the production of electricity deriving from the renewable energy source (if the network cannot accommodate the production at an instant "t", then the dihydrogen production pathway will be chosen); the production of a decarbonated hydrogen; the injection of electricity on the network at the moments when the latter needs it most.

Figure 5:
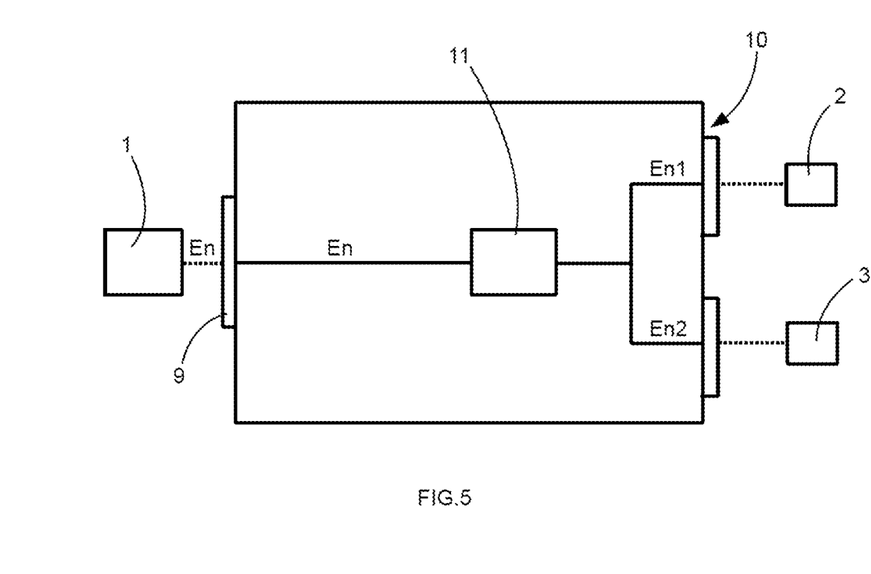
FIG. 5 illustrates a device configured to implement steps of the management method.

The invention also relates to a device as illustrated in FIG. 5. Such an energy management device comprises an element 9 for harvesting an electrical energy En from an energy source 1, notably from a renewable energy source; an element 10 for distributing the harvested electrical energy configured in such a way as to exhibit:
- a first configuration in which at least a part En1 of the harvested electrical energy En is injected into the electrical network 2,
- a second configuration in which at least a part En2 of the harvested electrical energy En is injected into a processing system 3 intended/configured to store it in a storage tank.

Furthermore, such a device comprises an element 11 for controlling the distribution of the electrical energy comprising an element for determining a state of storage of the tank and an element for determining a time to delivery of at least a part of the content of the tank.

It is understood that the processing system 3, the energy source 1 and the electrical network 2 can form an integral part of the device.

Thus, when the device comprises the processing system, the latter can comprise an electrolyzer powered by the energy injected into said processing system 3 in order to store said injected energy in the form of a product comprising hydrogen.

Alternatively, the device may not include the processing system 3, the energy source 1 and the electrical network 2. In this case, the device can comprise connection members suitable for being linked respectively to the processing system 3, to the energy source 1 and to the electrical network 2. Moreover, the device then comprises a first interface intended to be linked to the tank 4, for example a gauge of the tank 4.

The time to delivery can be programmed remotely, or correspond to a predetermined cycle.

It is understood that each step of the method as described previously can be performed by a particular element comprising the software and/or hardware means necessary for the implementation of the step concerned.

The device can comprise a computer configured to perform steps of the method as described. Such a computer can be interfaced with the elements of the device described above so as to perform the method.

The invention also relates to a computer-readable data storage medium, on which is stored a computer program comprising computer program code means for implementing steps of a management method as described in its different variants and implementations.

The invention also relates to a computer program comprising a computer program code means suitable for performing steps of the management method as described in its different variants and implementations, in particular when the program is run by a computer.

In the present description, reference is made to a product based on hydrogen or containing hydrogen, notably intended to be stored in the tank. This product is preferentially dihydrogen $H_2$. However, other chemical compounds could be envisaged for the storage but would require an additional transformation of dihydrogen (notably from electrolysis) to this other compound. It is possible, for example, to consider organic compounds (containing a C—H bond such as methanol, methane, formic acid, dimethylether) or even ammonia ($NH_3$). In all cases, these compounds include hydrogen atoms. In other words, through additional transformations, hydrogen could be stored in another chemical compound.

The invention claimed is:

1. An energy management method comprising:
    harvesting an electrical energy from an energy source supplying electrical energy to an electrical network conveying the electrical energy to consumers of electricity, the electrical network being connected to a storage tank configured to store electrical energy from the energy source and deliver stored electrical energy to the electrical network,
    distributing the harvested electrical energy to the electrical network and to the storage tank, the distributing being configured to be controlled so as to:
        in a first configuration, inject at least a part of the harvested electrical energy into the electrical network,
        in a second configuration, inject at least a part of the harvested electrical energy into a processing system configured so as to store it in the storage tank, and
    controlling the distribution of the electrical energy comprising:
        determining energy distribution constraints on the electrical network to receive an injection of electricity,
        determining a state of storage of the storage tank and determining a time to delivery of at least a predetermined quantity of the content of the storage tank, wherein the time to delivery is an obligation to deliver the predetermined quantity of the content of the storage tank into the electrical network, and
        dosing the distribution of the injecting of electrical energy into the electrical network and into the processing system from the need of the electrical network and from the determined values of the state of storage and the time to delivery, so that at the end of the time to delivery, the storage tank contains and is caused to deliver at least the predetermined quantity into the electrical network.

2. The method according to claim 1, comprising transforming at least a part of the electrical energy injected into the processing system into a product to be stored in the tank, and storing the product in the tank.

3. The method according to claim 2, the transforming comprises electrically powering an electrolyzer of the processing system by all or part of the electrical energy injected into the processing system so as to generate the product comprising hydrogen.

4. The method according to claim 3, comprising producing electricity by a fuel cell using a content of the tank as fuel.

5. The method according to claim 2, wherein the controlling comprises:
    determining a first indicator from the determined state of storage and from the determined time to delivery,
    determining a second indicator from the determined distribution constraints,
    comparing the first indicator with the second indicator, and
    determining setpoints for the control of the distribution of the harvested electrical energy from a result of the comparison.

6. The method according to claim 1, wherein the controlling comprises:
    determining a first indicator from the determined state of storage and from the determined time to delivery,
    determining a second indicator from the determined distribution constraints,
    comparing the first indicator with the second indicator, and
    determining setpoints for the control of the distribution of the harvested electrical energy from a result of the comparison.

7. The method according to claim 5, wherein the first indicator is equal to the following formula: $\sqrt{1-TTD^2} \times (1-SOC) + (1-\sqrt{1-(1-TTD)^2}) \times SOC$ with TTD being the determined time to delivery varying between the value 0, when the time to delivery has expired, and the value 1 when the tank has just been emptied or replaced, and SOC being the state of storage of the tank varying between 0, when the tank is empty, and 1 when the tank is full.

8. The method according to claim 1, wherein the controlling is performed continuously so as to adjust an operation of the distributing over time.

9. The method according to claim 1, comprising storing in a battery at least a part of the energy injected into the processing system.

10. The method according to claim 1, comprising delivering said at least predetermined part of the content of the tank on expiry of said determined time to delivery.

11. The method according to claim 1, wherein, based on a period remaining before expiry of the determined time to delivery and on the determined state of storage of the tank, the controlling is configured so that the filling of the tank is performed during the remaining period by a method chosen from: a linear filling, a nonlinear filling, a filling at the start of the remaining period, a filling at the end of the remaining period, or an intermittent filling.

12. The method according to claim 1, wherein in the dosing of the distribution of the injecting, the state of storage of the tank does not decrease until expiry of the time of delivery.

13. The method according to claim 1, wherein the harvested electrical energy is harvested from a renewable energy source.

14. An energy management device comprising:
a storage tank connected to an electrical network supplied in electrical energy from an energy source and conveying electrical energy to consumers of electricity, the storage tank being configured to store electrical energy from the energy source and deliver stored electrical energy to the electrical network, and
a computer configured to perform:
harvesting an electrical energy from the energy source,
distributing the harvested electrical energy to the electrical network and to the storage tank, the distributing being configured so as to exhibit:
a first configuration in which at least a part of the harvested electrical energy is injected into the electrical network,
a second configuration in which at least a part of the harvested electrical energy is injected into a processing system intended to store it in the storage tank, and
controlling the distribution of the electrical energy comprising:
determining energy distribution constraints on the electrical network to receive an injection of electricity,
determining a state of storage of the storage tank and determining a time to delivery of at least a predetermined quantity of the content of the storage tank, wherein the time to delivery is an obligation to deliver the predetermined quantity of the content of the storage tank into the electrical network, and
dosing the distribution of the injecting of electrical energy into the electrical network and into the processing system from the determined values of the state of storage and the time to delivery, so that at the end of the time to delivery, the storage tank contains and is caused to deliver at least the predetermined quantity into the electrical network.

15. The device according to claim 14, wherein the processing system comprises an electrolyzer powered by the energy injected into said processing system in order to store said injected energy in the form of a product comprising hydrogen.

16. The device according to claim 14, wherein the harvested electrical energy is harvested from a renewable energy source.

17. The device according to claim 14, which is configured so that the controlling comprises:

determining a first indicator from the determined state of storage and from the determined time to delivery,
determining a second indicator from the determined distribution constraints,
comparing the first indicator with the second indicator, and
determining setpoints for the control of the distribution of the harvested electrical energy from a result of the comparison.

18. The device according to claim 17, wherein the first indicator is equal to the following formula: $\sqrt{1-TTD^2} \times (1-SOC) + (1-\sqrt{1-(1-TTD)^2}) \times SOC$ with TTD being the determined time to delivery varying between the value 0, when the time to delivery has expired, and the value 1 when the tank has just been emptied or replaced, and SOC being the state of storage of the tank varying between 0, when the tank is empty, and 1 when the tank is full.

19. The device according to claim 14, which is configured so that the controlling is performed continuously so as to adjust an operation of the distributing over time.

20. A non-transitory computer-readable data storage medium, on which is stored a computer program comprising computer program code implementing, when executed on a computer controlling a storage tank connected to an electrical network supplied in electrical energy from an energy source and conveying electrical energy to consumers of electricity, the storage tank being configured to store electrical energy from the energy source and deliver stored electrical energy to the electrical network, an energy management method comprising:
harvesting an electrical energy from the energy source,
distributing the harvested electrical energy to the electrical network and to the storage tank, the distributing being configured to be controlled so as to:
in a first configuration, inject at least a part of the harvested electrical energy into the electrical network,
in a second configuration, inject at least a part of the harvested electrical energy into a processing system configured so as to store it in the storage tank, and
controlling the distribution of the electrical energy comprising:
determining energy distribution constraints on the electrical network to receive an injection of electricity,
determining a state of storage of the storage tank and determining a time to delivery of at least a predetermined quantity of the content of the storage tank, wherein the time to delivery is an obligation to deliver the predetermined quantity of the content of the storage tank into the electrical network, and
dosing the distribution of the injecting of electrical energy into the electrical network and into the processing system from the need of the electrical network and from the determined values of the state of storage and the time to delivery, so that at the end of the time to delivery, the storage tank contains and is caused to deliver at least the predetermined quantity into the electrical network.

21. The medium according to claim 20, which is configured so that the controlling comprises:
determining a first indicator from the determined state of storage and from the determined time to delivery,
determining a second indicator from the determined distribution constraints,
comparing the first indicator with the second indicator, and determining setpoints for the control of the distribution of the harvested electrical energy from a result of the comparison.

22. The medium according to claim 21, wherein the first indicator is equal to the following formula: $\sqrt{1-TTD^2} \times (1-SOC) + (1-\sqrt{1-(1-TTD)^2}) \times SOC$ with TTD being the determined time to delivery varying between the value 0, when the time to delivery has expired, and the value 1 when the tank has just been emptied or replaced, and SOC being the state of storage of the tank varying between 0, when the tank is empty, and 1 when the tank is full.

23. The medium according to claim 20, which is configured so that the controlling is performed continuously so as to adjust an operation of the distributing over time.

\* \* \* \* \*